Jan. 26, 1932. L. W. BRUEGGEMAN 1,842,506
AUTOMOBILE SKID PREVENTING DEVICE
Filed Oct. 22, 1929 2 Sheets-Sheet 1

INVENTOR.
LOUIS W. BRUEGGEMAN
BY Irving L. W. Cathran
ATTORNEYS.

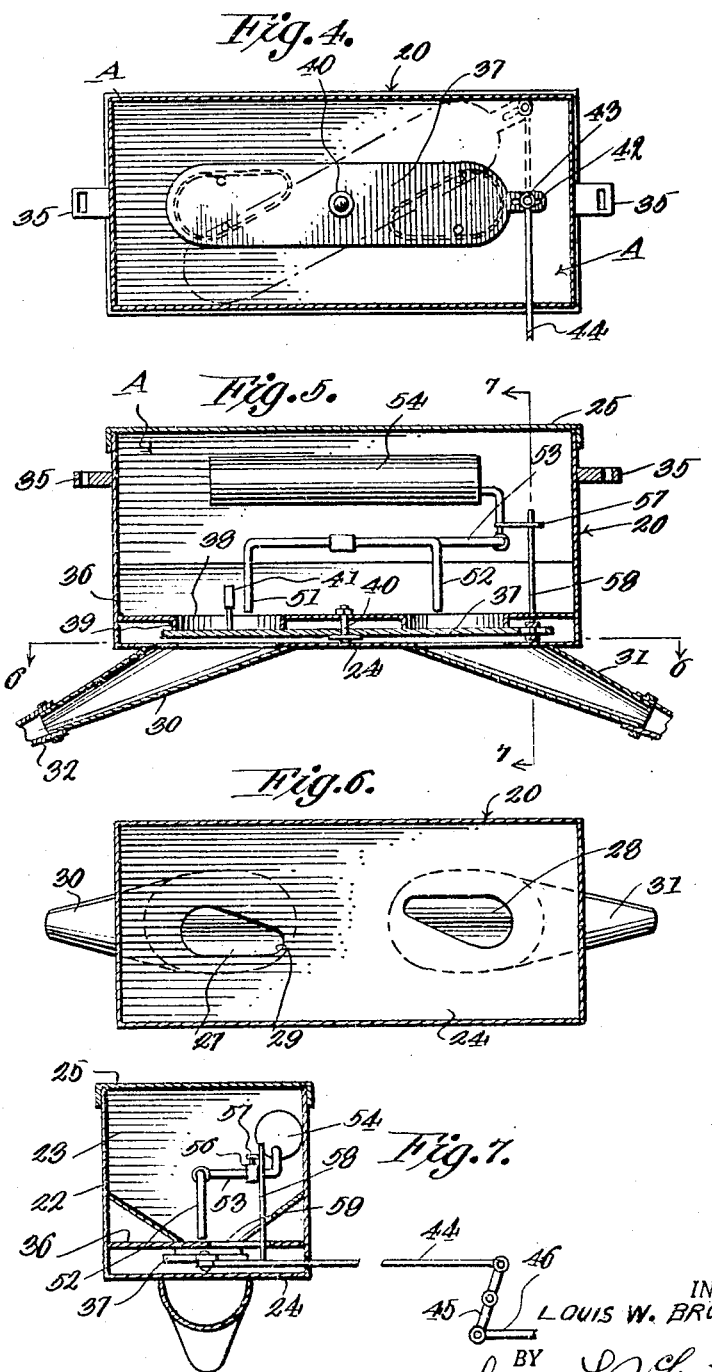

Patented Jan. 26, 1932

1,842,506

UNITED STATES PATENT OFFICE

LOUIS W. BRUEGGEMAN, OF MILWAUKEE, WISCONSIN

AUTOMOBILE SKID PREVENTING DEVICE

Application filed October 22, 1929. Serial No. 401,501.

This invention relates to automobiles and more particularly to a novel safety attachment therefor, for preventing skidding of the vehicle on wet, icy or muddy streets and highways.

One of the primary objects of my invention is to provide a novel attachment for automobiles for effectively preventing skidding thereof, said means including a novel device under the control of the driver of the vehicle for delivering cinders, sand or the like to the wheels of the vehicles, so as to permit the tires of the vehicle to obtain a firm grip on the roadway.

Another salient object of my invention is to provide an improved anti-skidding device for automobiles embodying a hopper having communicating with the opposite ends thereof delivery chutes or tubes leading toward the wheels of the vehicle with means for controlling the passage of the sand, cinders or the like from the hopper into the chutes or delivery tubes.

A further important object of my invention is the provision of a novel valve plate carried by the hopper for controlling the flow of cinders into the delivery chutes or tubes with means carried by the valve plate for agitating the sand or cinders during the opening of the valve plate so as to insure the proper flow of the cinders or sand through the delivery chutes or tubes.

A further object of my invention is the provision of means for permitting the effective operation of the valve plate from the driver's seat of the automobile, so that the same can be conveniently and quickly actuated.

A further object of my invention is the provision of means for insuring the positive and proper flow of the sand or cinders through the chutes upon the opening of the valve plate, said means including compressed air outlet nozzles leading toward the chute or delivery tube inlet, with means for automatically operating a control valve for the compressed air upon the manual opening of the valve plate.

A still further object of my invention is to provide an improved attachment for automobiles of the above character, which will be durable and efficient in use, one that will be simple and easy to manufacture, and one which can be placed upon the market and incorporated with an automobile at a low cost.

With these and other objects in view, the invention consists in the novel construction, arrangement and formation of parts, as will be hereinafter more specifically described, claimed, and illustrated in the accompanying drawings, in which drawings:—

Figure 4 is a horizontal section taken on the line 4—4 of Figure 2 looking in the direction of the arrows illustrating the control vave plate for the hopper outlet.

Figure 5 is a longitudinal section taken on the line 5—5 of Figure 3 looking in the direction of the arrows illustrating the formation of the hopper and the control valve plate.

Figure 6 is a horizontal section through the hopper taken on the line 6—6 of Figure 5 looking in the direction of the arrows showing the outlet openings formed in the bottom wall of the hopper.

Figure 7 is a transverse section of the hopper taken on the line 7—7 of Figure 5 looking in the direction of the arrows illustrating the operating means for the control valve plate and the means for automatically opening the air supply valve.

Referring to the drawings in detail, wherein similar reference characters designate corresponding parts throughout the several views, the letter A generally indicates my improved safety device and B an automobile with which the same can be associated.

Figure 1:
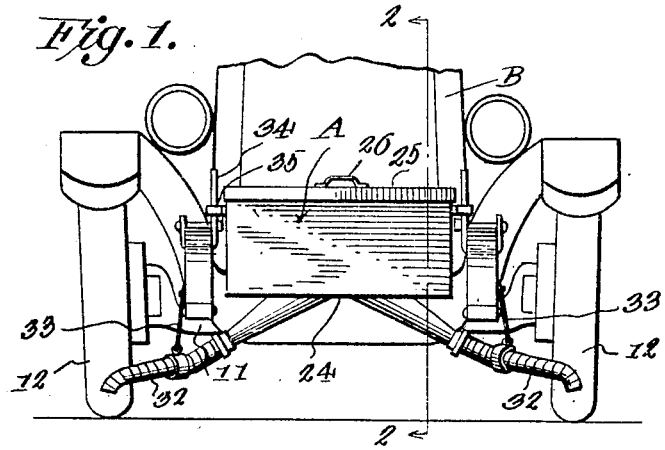
Figure 1 is a fragmentary front elevation of an automobile showing my improved device incorporated therewith.
Figure 2:
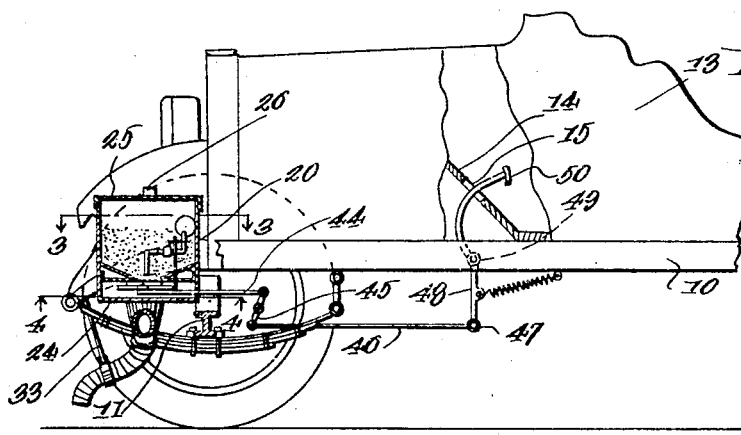
Figure 2 is a section taken on the line 2—2 of Figure 1 looking in the direction of the arrows.
Figure 3:
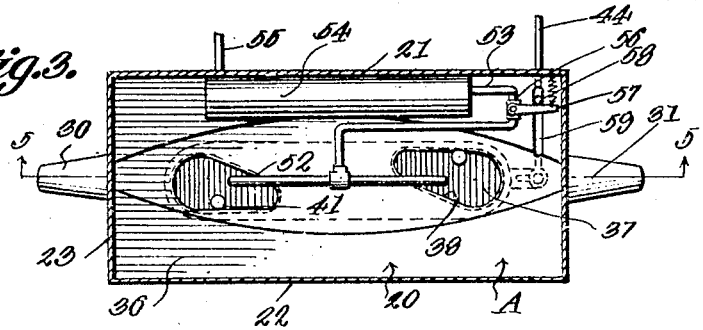
Figure 3 is a horizontal section taken through the hopper of my improved device on the line 3—3 of Figure 2 looking in the direction of the arrows.

The automobile B can be of any preferred type or make and has simply been shown to illustrate my invention, and the vehicle can include the usual frame or chassis 10 supporting front dead axle 11 which supports at its ends front steering wheels 12. The frame 10 supports any preferred type of body 13, provided with the usual front foot board 14 which is provided with an opening 15 for a purpose, which will be later described.

My improved attachment A comprises a container or hopper 20 which can be formed of sheet metal of the desired gage for the reception of the cinders, sand, or ashes, as the case may be, and this hopper or container can be suitably treated and painted to present an attractive appearance and to blend in with the color scheme of the vehicle. In the present instance I have shown the hopper 20 arranged at the front of the vehicle and forwardly of the radiator of the vehicle, but it is to be understood that the hopper can be made in any preferred size and located at any desired point, such as within the hood of the vehicle if preferred. In the present instance I have shown the hopper arranged so as to deliver cinders, sand or ashes, as the case may be, to the front wheels of the vehicle only, but it is to be understood that the anti-skidding material can likewise be delivered to the rear wheels if preferred.

This hopper 20 includes a rear wall 21, a front wall 22, connecting end walls 23 and a bottom wall 24. A removable cover 25 is provided for the upper end of the hopper so as to permit the convenient filling of the hopper with the desired anti-skidding material, and this cover can be provided with a manipulating handle 26. The lower wall 24 of the hopper is provided with outlet openings 27 and 28 on opposite sides of the transverse center thereof and these outlet openings preferably gradually narrow toward their inner ends as at 29 on opposite sides of the longitudinal center of the hopper. Communicating with the outlet openings 27 and 28 are the depending outwardly and downwardly inclined delivery funnels 30 and 31 which lead toward the opposite front wheels 12 of the vehicle. These delivery funnels 30 and 31 can have connected therewith suitable flexible delivery tubes or chutes 32 which are preferably suspended by means of hangers 33 adjacent to the front of the front wheels 12. As shown these hangers 33 are connected with the supporting front spring hangers of the vehicle but it is to be understood that the hangers can be carried by any other preferred part of the automobiles. Likewise the hopper or container 20 can be held in place in any desired way and in the present instance I have shown the side beams of the vehicle provided with brackets which include upstanding supporting standards 34 and these standards receive eyes 35 carried by the opposite end walls of the container or hopper. This provides a convenient means for detachably securing the container or hopper in place.

In accordance with my present invention the hopper 20 is provided with a false bottom 36 which is arranged adjacent to but in spaced relation to the bottom wall 24 of the hopper and this false bottom plate 36 and the bottom wall 24 defines between the same a valve chamber for the reception of the valve control plate 37, as will be more fully described. The false bottom 36 is provided with outlet openings 38 which are arranged directly above the outlets 27 and 28 formed in the bottom plate 24. The outlet openings 38 are preferably surrounded by depending flanges 39 which form a valve seat for the plate 37. This valve plate 37 extends normally longitudinally of the container or hopper and is rockably mounted at a point intermediate its ends on a pivot bolt 40 so that the plate will extend in opposite directions under the openings 38. The plate is suspended in such a manner as to normally snugly engage the lower edges of the flanges 39 so as to prevent the escape of the anti-skidding material from the main body portion of the hopper. These openings 38 are shaped similar to the outlet openings 27 and 28 in the bottom wall 24 of the hopper and it is to be noted that the same gradually decrease in width toward their inner ends on opposite sides of the longitudinal center of the hopper. The opposite ends of the valve plate 37 preferably carry upstanding agitating pins 41 which extend through the openings 38 into the hopper, whereby when the valve plate is rocked the pins 41 will have a tendency to agitate the anti-skidding material to facilitate the flow thereof through the openings 38 and into the delivery funnels 30 and 31.

When the plate 37 is in its normal position, as shown in Figure 4 of the drawings, the same will lie directly below the openings 38 and thus prevent the flow of cinders, sand, ashes or the like through said openings, but when the plate is rocked, by means which will be later described, the ends of the plate are moved away from the openings, as shown in dotted lines in Figure 4 of the drawings, allowing the free flow of the sand or other anti-skidding material through the openings and into the funnels 30 and 31. One end of the valve plate 37 is provided with a slotted ear 42 which is pivotally connected by means of a pin 43 with the operating link 44. This operating link 44 extends rearwardly of the container or hopper 20 under the car and is connected to one end of a double ended lever 45. This lever 45 is rockably mounted intermediate its ends on a suitable portion of the vehicle and the opposite end of the lever 45 from the end to which the link 44 is connected has connected thereto a pull rod 46. This pull rod 46 is pivotally connected as at 47 to the lower end of a foot pedal 48. The foot pedal 48 is rockably mounted intermediate its ends as at 49 on the frame of the vehicle and the upper end thereof is extended through the opening 15 of the foot board 14 of the vehicle, and is provided with a suitable foot plate 50. This foot pedal with its foot plate 50 is preferably arranged adjacent to the brake and clutch levers so that the same can be conveniently operated by the driver of the vehicle and it is obvious that when the pedal is depressed that the pull rod 46 will be drawn rearwardly, consequently pushing the link 44 forwardly and rocking the valve plate 37 on its pivot bolt 40.

This will move the valve plate to its open position allowing the flow of the sand, ashes, cinders or the like from the hopper into the funnels 30 and 31 where the same will be delivered to the flexible tubes 32 in front of the wheels 12.

In a device of this character it is essential that the anti-skidding material such as the sand, cinders, or the like be instantly delivered to the wheels upon the operation of the foot pedal and any tendency of the sand or other anti-skidding material to clog around the openings would be fatal to the successful operation of the device. I have therefore provided a novel means for insuring the proper flow and quick delivery of the sand, cinders, or the like to the funnels and through the same. This means embodies compressed air outlet nozzles 51 and 52 arranged directly above the openings 38 and these outlet nozzles lead from a pipe 53 which supplies the compressed air thereto. This pipe 53 leads from a tank 54 which can be arranged directly within the hopper or container 20. The tank 54 is provided with a supply pipe 55 which can lead from any suitable source of supply of compressed air, such as an air pump or the like (not shown).

The pipe 53 has incorporated in the length thereof a control valve 56 having an operating handle 57. This valve is normally maintained in any desired way in a closed position and is adapted to be operated and moved to an open position upon the operation of the valve plate 37.

The link 44 for the valve plate is provided with an upstanding pin 58 which leads through a slot 59 formed in the false bottom 36 and the operating arm 57 for the valve is arranged in the path of the said pin 58, whereby upon forward movement of the link for moving the valve plate to its open position, the handle 57 will be manipulated, and the compressed air valve open. It is thus obvious that jets of air under pressure will be delivered to the openings 38 thereby insuring the forcing of the anti-skidding material through the openings, funnels and delivery chutes or tubes 32. This forms an important part of my invention and adds considerably to the positive operation of the device.

Should the vehicle equipped with this device, start to skid on a slippery pavement or highway, it is merely necessary for the operator to push down on the pedal 48 which will operate the valve plate 37 and open the valve 56 as hereto before described. This will permit immediate delivery of anti-skidding material to the ground in front of the wheels, consequently allowing the tires of these wheels to obtain a firm grip on the roadway and prevent further skidding of the vehicle.

From the foregoing description, it can be seen that I have provided a novel and simple device, which can be conveniently attached to a motor vehicle for preventing accidents due to skidding and the like.

Changes in details may be made without departing from the spirit or the scope of this invention:—

What I claim as new is:

1. The combination with an automobile, of an anti-skid atachment therefor comprising a hopper having depending funnels adjacent to the opposite ends thereof, a valve plate rockably mounted intermediate its ends in said hopper and having its opposite ends extending normally over the funnels for controlling the flow of material in said hopper to said funnels, and means operated from the driver's seat of the vehicle for rocking the valve plate on its pivot for moving the terminal thereof away from said funnels.

2. The combination with an automobile, of an anti-skid attachment therefor comprising a hopper including a bottom wall having outlet openings, depending funnels leading from said openings, delivery tubes connected with the funnels, a false bottom in said hopper having openings formed therein directly above the outlet openings and provided with valve seats, a valve plate rockably mounted intermediate its ends in said hopper having its terminals normally on said valve seat for preventing the flow of material therethrough, means for rocking the valve plate.

3. The combination with an automobile, of an anti-skid attachment therefor comprising a hopper including a bottom wall having outlet openings, depending funnels leading from said openings, delivery tubes connected with the funnels, a false bottom in said hopper having openings formed therein directly above the outlet openings and provided with valve seats, a valve plate rockably mounted intermediate its ends in said hopper having its terminals normally on said valve seat for preventing the flow of material therethrough, means for rocking the valve plate, and agitating pins carried by the valve plate for extending through the valve seat.

4. An attachment for automobiles comprising a hopper including a bottom wall having an outlet opening, a delivery chute carried by the hopper and surrounding the opening, a false bottom arranged in the hopper in spaced relation to the lower wall thereof provided with an opening directly above the outlet opening, a valve plate pivotally mounted between the false bottom plate and the bottom wall of the hopper for controlling the flow of material through the opening in said false bottom, an operating rod for the pivoted valve plate and extending exteriorly of the hopper, a supply pipe for compressed air leading into said hopper, a nozzle communicating with said pipe and terminating directly above the opening in the false bottom, a control valve in the length of said pipe, a manipulating pin carried by the operating rod and extending into the hopper, and an operating handle for the air valve arranged in the path of said pin.

In testimony whereof I affix my signature.

LOUIS W. BRUEGGEMAN.